United States Patent
Sharma et al.

(10) Patent No.: US 10,491,522 B2
(45) Date of Patent: Nov. 26, 2019

(54) DATA PLANE INTEGRATION

(71) Applicant: CISCO TECHNOLOGY, INC., San Jose, CA (US)

(72) Inventors: Samar Sharma, San Jose, CA (US); Venkatabalakrishnan Krishnamurthy, Cupertino, CA (US); Ravinder Reddy Amanaganti, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 207 days.

(21) Appl. No.: 15/482,566

(22) Filed: Apr. 7, 2017

(65) Prior Publication Data
US 2017/0331739 A1    Nov. 16, 2017

Related U.S. Application Data

(60) Provisional application No. 62/336,206, filed on May 13, 2016.

(51) Int. Cl.
| | |
|---|---|
| *H04L 12/743* | (2013.01) |
| *H04L 12/803* | (2013.01) |
| *H04L 29/08* | (2006.01) |
| *H04L 29/06* | (2006.01) |
| *H04L 12/801* | (2013.01) |
| *H04L 12/755* | (2013.01) |
| *H04L 12/851* | (2013.01) |

(52) U.S. Cl.
CPC ........ *H04L 45/7453* (2013.01); *H04L 45/021* (2013.01); *H04L 47/10* (2013.01); *H04L 47/2483* (2013.01); *H04L 63/02* (2013.01); *H04L 63/0254* (2013.01); *H04L 63/04* (2013.01); *H04L 63/20* (2013.01); *H04L 67/2814* (2013.01); *H04L 67/2852* (2013.01); *H04L 69/22* (2013.01)

(58) Field of Classification Search
None
See application file for complete search history.

(56) References Cited

U.S. PATENT DOCUMENTS

| | | | |
|---|---|---|---|
| 6,389,419 B1 * | 5/2002 | Wong .................... | H04L 45/745 707/747 |
| 6,735,657 B1 | 5/2004 | Falk et al. | |
| 7,386,628 B1 * | 6/2008 | Hansell ................. | H04L 45/745 709/236 |

(Continued)

FOREIGN PATENT DOCUMENTS

WO    2016/171957 A1    10/2016

OTHER PUBLICATIONS

U.S. Appl. No. 15/482,579, filed Apr. 7, 2017, entitled "Plug and Play in a Controller Based Network," Inventor(s): Samar Sharma, et al.

*Primary Examiner* — Duc T Duong

(57) ABSTRACT

In an example, a system and method for data plane integration is described. Aspects of the embodiments are directed to a service application connected to a switch of a network fabric and a method of data plane integration performed at a service appliance, the service appliance providing firewall functionality. The service appliance can receive a data packet from a network location; determine a flow owner of the data packet based on a hashing table; and transmit the data packet based on the determined flow owner of the data packet.

20 Claims, 11 Drawing Sheets

(56) References Cited

U.S. PATENT DOCUMENTS

| | | | |
|---|---|---|---|
| 7,480,234 B1 | 1/2009 | Hart et al. | |
| 7,809,020 B2 | 10/2010 | Douglas et al. | |
| 8,159,932 B1 | 4/2012 | Hart et al. | |
| 8,307,115 B1* | 11/2012 | Hughes | H04L 67/1095 709/238 |
| 9,794,146 B2 | 10/2017 | Mammen et al. | |
| 9,866,480 B1* | 1/2018 | Borad | H04L 45/7453 |
| 9,954,762 B2 | 4/2018 | Calciu et al. | |
| 10,003,495 B1 | 6/2018 | Sharma et al. | |
| 2010/0045302 A1 | 2/2010 | Karam | |
| 2010/0158003 A1* | 6/2010 | Rijhsinghani | H04L 45/00 370/392 |
| 2011/0026403 A1* | 2/2011 | Shao | H04L 67/2895 370/235 |
| 2011/0317701 A1 | 12/2011 | Yamato et al. | |
| 2012/0195210 A1 | 8/2012 | Grayson | |
| 2014/0006549 A1* | 1/2014 | Narayanaswamy | H04L 67/327 709/217 |
| 2014/0153571 A1* | 6/2014 | Neugebauer | H04L 45/7457 370/392 |
| 2014/0259140 A1* | 9/2014 | Subramanian | H04L 63/02 726/11 |
| 2015/0215183 A1 | 7/2015 | Bucci et al. | |
| 2015/0312155 A1* | 10/2015 | Anand | H04L 45/7453 370/231 |
| 2016/0094394 A1 | 3/2016 | Sharma et al. | |
| 2016/0212025 A1 | 7/2016 | Mammen | |
| 2016/0212026 A1 | 7/2016 | Mammen et al. | |
| 2016/0218925 A1 | 7/2016 | Mammen et al. | |
| 2016/0360539 A1 | 12/2016 | Ben Ami et al. | |
| 2016/0380876 A1 | 12/2016 | Calciu et al. | |
| 2017/0126664 A1* | 5/2017 | Khandelwal | H04L 63/0823 |
| 2017/0155579 A1 | 6/2017 | Shih | |
| 2017/0195253 A1 | 7/2017 | Annaluru et al. | |
| 2017/0234584 A1 | 8/2017 | Savic et al. | |
| 2017/0324584 A1 | 11/2017 | Li | |
| 2017/0331765 A1 | 11/2017 | Sharma et al. | |
| 2018/0359311 A1* | 12/2018 | Paramasivam | G06F 17/3053 |

* cited by examiner

600

```
┌─────────────────────────────────┐
│ Receiving, at a first service   │
│ appliance, at least a portion   │──── 602
│ of a hashing table from a       │
│ network switch                  │
└─────────────────────────────────┘
               │
               ▼
┌─────────────────────────────────┐
│ Receiving, at the first service │──── 604
│ appliance, a data packet        │
└─────────────────────────────────┘
               │
               ▼
┌─────────────────────────────────┐
│ Identifying a flow owner of the │
│ data traffic based, at least in │──── 606
│ part, on the hashing table      │
└─────────────────────────────────┘
               │
               ▼
┌─────────────────────────────────┐
│ Determining that the data       │
│ traffic is associated with a    │
│ second service appliance based, │──── 608
│ at least in part, on the        │
│ hashing table                   │
└─────────────────────────────────┘
               │
               ▼
┌─────────────────────────────────┐
│ Transmitting the data traffic   │──── 610
│ to the second service appliance │
└─────────────────────────────────┘
```

```
┌─────────────────────────────────────────────────────────┐
│ Receiving, at a first service appliance, at least a     │  702
│ portion of a routing table from a network switch        │
└─────────────────────────────────────────────────────────┘
                            │
                            ▼
┌─────────────────────────────────────────────────────────┐
│ Receiving, at the first service appliance, a data packet│  704
└─────────────────────────────────────────────────────────┘
                            │
                            ▼
┌─────────────────────────────────────────────────────────┐
│ Identifying a flow owner of the data traffic based, at  │  706
│ least in part, on the routing table                     │
└─────────────────────────────────────────────────────────┘
                            │
                            ▼
┌─────────────────────────────────────────────────────────┐
│ Determining that the data traffic is associated with a  │  708
│ second service appliance based, at least in part, on    │
│ the routing table                                       │
└─────────────────────────────────────────────────────────┘
                            │
                            ▼
┌─────────────────────────────────────────────────────────┐
│ Transmitting the data traffic to the second service     │  710
│ appliance                                               │
└─────────────────────────────────────────────────────────┘
                            │
                            ▼
┌─────────────────────────────────────────────────────────┐
│ Receiving an update to the at least a portion of the    │  712
│ routing table from the network switch                   │
└─────────────────────────────────────────────────────────┘
                            │
                            ▼
┌─────────────────────────────────────────────────────────┐
│ Updating the at least a portion of the routing table    │  714
│ based on the update received from the network switch    │
└─────────────────────────────────────────────────────────┘
```

FIG. 7

DATA PLANE INTEGRATION

CROSS REFERENCE TO RELATED APPLICATIONS

This application claims the benefit of priority under 35 U.S.C. § 119(e) to U.S. Provisional Application Ser. No. 62/336,206 entitled "DATA PLANE INTEGRATION," filed May 13, 2016, which is hereby incorporated by reference in its entirety.

FIELD OF THE DISCLOSURE

This disclosure relates in general to the field of communications and, more particularly, to a system and method for using a service appliance to reduce the resource demand of a network firewall.

BACKGROUND

Data centers are increasingly used by enterprises for effective collaboration, data storage, and resource management. A typical data center network contains myriad network elements including servers, load balancers, routers, switches, etc. The network connecting the network elements provides secure user access to data center services and an infrastructure for deployment, interconnection, and aggregation of shared resources. Improving operational efficiency and optimizing utilization of resources in data centers are some of the challenges facing data center managers. Data center managers seek a resilient infrastructure that consistently supports diverse applications and services. A properly planned data center network provides application and data integrity and, further, optimizes application availability and performance.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other example, the dimensions of the various features may be arbitrarily increased or reduced for clarity of discussion.

FIG. 6 is a process flow diagram for load balancing in a service appliance in accordance with embodiments of the present disclosure.

FIG. 7 is a process flow diagram for sharing routing functionality between service appliances in accordance with embodiments of the present disclosure.

Figure 1A:
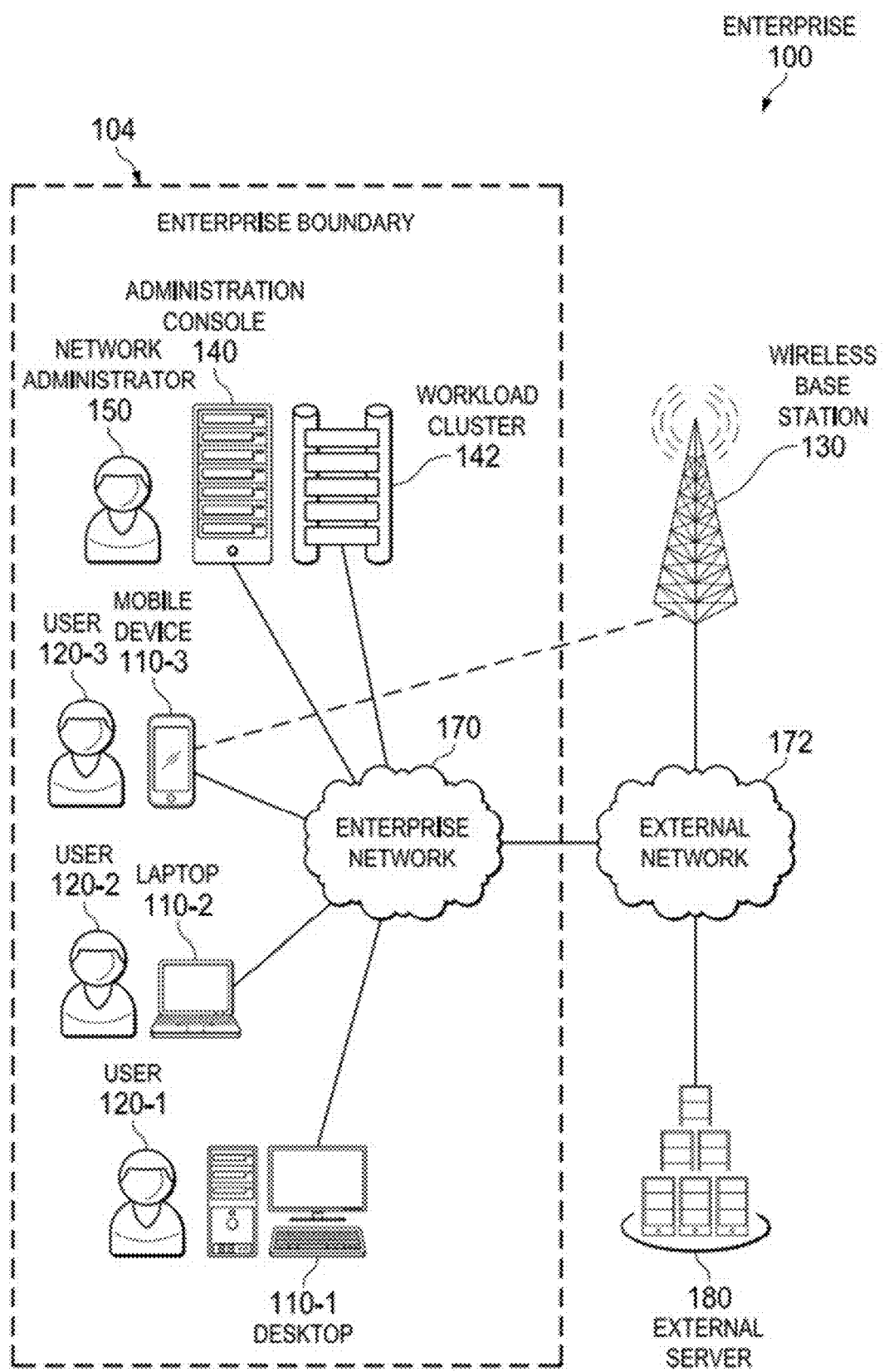
FIG. 1A is a network level diagram of an enterprise computing environment according to one or more examples of the present Specification.

Additional details are disclosed in the supplemental FIGURES.

SUMMARY

In an example, there is disclosed a system and method for fabric integration.

Aspects of the embodiments are directed to a method of data plane integration performed at a first service appliance, the service appliance providing firewall functionality, the method including receiving a data packet from a network location; determining a flow owner of the data packet based on a hashing table; and transmitting the data packet based on the determined flow owner of the data packet.

Aspects of the embodiments are directed to a computer-readable non-transitory medium comprising one or more instructions for load balancing in a network service appliance, the instructions when executed on a processor are operable to receive a data packet from a network location; determine a flow owner of the data packet based on a hashing table; and transmit the data packet based on the determined flow owner of the data packet.

Aspects of the embodiments are directed to a network service appliance communicably coupled to a network switch, the network service appliance configured to provide firewall functionality, the network service appliance comprising at least one memory element having instructions stored thereon; and at least one processors coupled to the at least one memory element and configured to execute the instructions to cause the network service appliance to receive a data packet from a network location; determine a flow owner of the data packet based on a hashing table; and transmit the data packet based on the determined flow owner of the data packet

DETAILED DESCRIPTION OF THE EMBODIMENTS

The following disclosure provides many different embodiments, or examples, for implementing different features of the present disclosure.

In an example of a known computing system, a cluster of workload servers may be provisioned, either as physical servers or as virtual machines, to provide a desired feature to end-users or clients. To provide just one nonlimiting example, the workload servers may provide a website. When a plurality of users make a large number of simultaneous connections to the website, it is necessary to appropriately distribute the workload among the various servers in the server farm.

To this end, incoming traffic from client devices may be routed to a network switch. The network switch may then forward the traffic to a load balancer. An example of a commonly used load balancer is a network appliance or virtual appliance running a Linux operating system and provided with a full network stack, as well as load-balancing logic for determining which server to send the traffic to.

For example, a workload cluster may include 16 nodes, either physical servers or virtual machines. The load balancer itself may also be either a physical appliance or a virtual appliance. Upon receiving a packet, the load balancer determines the load on each of the 16 workload servers. The load balancer then applies an algorithm to determine an appropriate node for handling the traffic. This may include, for example, identifying a least burdened node and assigning the traffic to that node. Each node may have its own IP address, which in one embodiment is not exposed to end-user client devices. Rather, client devices are aware only of the IP address of the load balancer itself. Thus, the load balancer may modify the packet header, for example, by assigning it to the virtual IP (VIP) of one of the workload servers. The load balancer may then return the packet to the switch, which routes the packet to the appropriate workload server.

In this example, the incoming packet transfers from the switch to the load balancer, which may provide the full OSI 7 layer "stack" in software, operating on a full-featured operating system, such as Linux. Thus, the incoming packet is abstracted up to one of the upper layers of the OSI model, such as layer 6 or 7, so that it can be handled by the load-balancing software. The packet is then de-abstracted to a lower layer and returned to the switch, which forwards it to the appropriate workload server. Upon receiving the packet, the workload server again abstracts the packet up to one of the higher levels of the OSI model.

The load balancer, and its overhead, represent a potential bottleneck that reduces the scalability of the network environment, and slows down handling of network traffic. The process of passing the packet up and down the OSI stack, in particular, while very fast from a human point of view, can be a significant bottleneck from the point of view of a network.

However, the named inventors of the present Application have recognized that a network device, such as a switch or a router, can be configured to natively act as a load balancer in addition to performing its ordinary network switching function. In that case, rather than provide a load-balancing algorithm in an application running on an operating system, the switch may provide load-balancing via a much faster solution, such as programmable hardware rather than a general purpose software-driven processor. This means that the load-balancing logic is handled mostly or entirely at the hardware level. Furthermore, the switch generally operates at lower levels of the OSI model, such as layers 1 and 2. Thus, it has reduced overhead in abstracting and de-abstracting packets through the OSI stack.

Thus, the switch itself can act as a load balancer, and rather than acting as a bottleneck, is capable of providing terabit-class bandwidth by operating at the hardware level. Switch bandwidth can be consumed, however, by load balancing functionality. Therefore, this disclosure describes sharing load balancing functionality with one or more service appliances communicably connected to the network switch. The service appliances can provide various network functionality, including firewall and other security-related functionality. The service appliances add load balancing functionality by using a hash table prepared and distributed by the network switch to reroute data traffic to other service appliances (i.e., service appliances acting as firewalls). The service appliances can be clustered using a clustering protocol to facilitate communication between the several service appliances, thereby allowing each service appliance to perform load balancing functionality.

In addition, the service appliances can perform routing functionality. As a firewall, however, the routing functionality is managed by the network switch. The network switch can manage routing information for each of the several service appliances. For example, the network switch can provide routing tables and can provide updates to the routing tables and tables of adjacencies as the network landscape changes.

In an example, a concept of traffic buckets and nodes is described. Traffic may be divided into "buckets." Each bucket may be assigned to a node.

A traffic bucket serves as a classifier for identifying a subset of traffic to be redirected. As many traffic buckets can be created as needed for granularity. For bucketization of traffic, various L2/L3 header fields can be used in the algorithm.

By selecting different fields, many buckets can be created. By way of example, B0, B1, B2, B3, B4 . . . Bn may be used to designate traffic buckets.

A traffic node serves as a "next-hop" for traffic forwarding. A node is an entity that has an associated IP address reachable from the switch. By way of example, N0, N1, N2, N3 . . . Nm may be used to designate nodes.

Mapping can be established to associate a traffic bucket to a node. This association creates a packet path for forwarding of traffic for each bucket. This can include one-to-one mapping of a traffic bucket to a node, or many-to-one mapping of traffic buckets to a node (i.e., multiple nodes may be assigned to a single node).

This architecture realizes substantial advantages over certain existing deployments. For example, some existing load balancers suffer from shortcomings such as inefficiency and expense. In one example, a low capacity load-balancer provides approximately 40 Gbps, while a higher-end load balancer provides approximately 200 Gbps.

As discussed above, speed and scalability are enhanced by programming the load balancing engine in programmable hardware rather than in software running on a general-purpose processor programmed by software. Programmable hardware includes, for example, an application-specific integrated circuit (ASIC), field-programmable gate array (FPGA), programmable logic array (PLA), or similar. Because the logic is implemented directly in hardware, it can execute a "program" orders of magnitude faster than a CPU, which must fetch instructions from memory, and then run those instructions on general-purpose hardware. Furthermore, an operating system, multitasking, and multi-layer network stack introduce additional complexity that does not contribute directly to carrying out the load balancing function. In short, a software-programmable CPU is extremely versatile, and its function may be easily adapted to many different tasks, but it is relatively slow. A dedicated programmable hardware device, programmed only for a single function, is not versatile, but carries out its single, dedicated function very quickly.

In one example, a hardware-based load balancer of the present Specification must be able to handle both traffic that is to be load balanced, and traffic that does not require load balancing. For non-load-balanced traffic, the device should still perform its native function as a switch or router, and simply switch or route the traffic as appropriate.

To aid in this, and to preserve the speed advantage of the programmable hardware-based load balancing engine, it is advantageous not to store data values in standard memories such as random access memories (RAM), as this could negate the speed advantages of the hardware. Rather, in one example, a ternary content-addressable memory (TCAM) is provided, and may be capable of operating at speeds approaching the speed of the programmable hardware itself. A content-addressable memory (CAM) is a species of memory used in extremely high-speed searches, such as those necessary for native terabit-class load balancing. CAM compares the search input (tag) to a table of stored data, and returns the address of matching datum. This is in contrast to RAM, in which the program provides an address, and the RAM returns a value stored at that address. When a search is performed, if the CAM finds a match for the tag, the CAM returns the address of the tag, and optionally, the value of the tag as well. If the tag is not found, a "not found" value is returned. TCAM is a species of CAM, in which a tag can be searched not only for a binary "1" or "0," but also for a ternary "X" (don't care). In other words, the search tag "110X" matches both "1101" and "1100."

In the context of load balancing, a network administrator may configure a virtual IP (VIP) tag, including in one example an IP address, protocol, and port number. Entries may be made in the TCAM for VIP tags that are to be load balanced. Entries may also be made for a set of nodes that can receive traffic matching that VIP tag.

The switch advertises the VIP tag via routing protocols, and receives traffic destined for VIP. When traffic enters the switch or router, the VIP tag is checked against entries in the TCAM. If there is a matching entry, the traffic is to be load balanced. The traffic is then bucketized and load balanced to each node using TCAM entries.

This architecture realizes several important advantages. As servers move from 1 Gbps to 10 Gbps, traditional software load balancers have to scale appropriately. Load balancer appliances and service modules also consume rack-space, power, wiring and cost. However, in an embodiment of the present Specification:
  a. Every port of a switch or router can act as a load-balancer.
  b. No external appliance and no service module are needed.
  c. The teachings of this Specification can be used to provide terabit-class load balancing.

Furthermore, scalability is greatly enhanced. Many network switches have the ability to modularly increase their size by adding on I/O modules. For example, a switch may have a baseline size of 48 ports, wherein each port can be connected to one physical server appliance. The physical server appliance may be a standalone appliance providing the workload service, or may be a server configured to provide a hypervisor and to launch instances of virtual machines on demand. If the 48 ports on the switch are exhausted, an additional I/O module, for example providing an additional 48 ports, may be added onto the switch. Thus, the switch can be scaled up to extremely large sizes with minimal configuration. The switch itself may be provided with a load-balancing engine, which in this case may include dedicated hardware, firmware, or very low-level software such as BIOS to provide the load-balancing logic.

A data center switch operates at 10s of Terabits per second. A security device such as Firewall/IP operates at a few gigabits per second. This is orders of magnitude of difference. This specification describes ways to offload the security devices and also to make sure that the security devices are sent the minimum data needed.

In embodiments, the:
  a. Dynamically push the access control lists (ACLs) from the firewall (FW) to switch
  b. During DDoS, push the ACLs
  c. Offload certain trusted flows from firewall to N7k. For example, elephant flows, low latency, long lived flows. Have periodic check between FW and switch to ensure the flow is still trusted.
  d. RISE will install policy-based routing (PBR) rules to redirect traffic based on dynamic ACL
  e. Get FIB table updates from switch to appliance
    i. For DDoS handling
    ii. For port policies
  f. Flow migration: one NS can move its flows to N7k, and shrink the cluster size.
  g. Clustering: hash table formula can be notified to appliance for better clustering. Whether it is L2 hash or ECMP hash.
  h. Programming route entries from N7k into the appliance.

Additional details are disclosed in the supplemental FIGURES.

A system and method for data plane integration will now be described with more particular reference to the attached FIGURES. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments many have different advantages, and no particular advantage is necessarily required of any embodiment. In some embodiments, hyphenated reference numerals, such as 10-1 and 10-2, may be used to refer to multiple instances of the same or a similar item 10, or to different species of a genus 10.

FIG. 1A is a network-level diagram of a secured enterprise 100 according to one or more examples of the present Specification. In the example of FIG. 1, a plurality of users 120 operates a plurality of client devices 110. Specifically, user 120-1 operates desktop computer 110-1. User 120-2 operates laptop computer 110-2. And user 120-3 operates mobile device 110-3.

Each computing device may include an appropriate operating system, such as Microsoft Windows, Linux, Android, Mac OSX, Apple iOS, Unix, or similar. Some of the foregoing may be more often used on one type of device than another. For example, desktop computer 110-1, which in one embodiment may be an engineering workstation, may be more likely to use one of Microsoft Windows, Linux, Unix, or Mac OSX. Laptop computer 110-2, which is usually a portable off-the-shelf device with fewer customization options, may be more likely to run Microsoft Windows or Mac OSX. Mobile device 110-3 may be more likely to run Android or iOS. However, these examples are not intended to be limiting.

Client devices 110 may be any suitable computing devices. In various embodiments, a "computing device" may be or comprise, by way of non-limiting example, a computer, workstation, server, mainframe, embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, virtual machine, virtual appliance, or any other electronic, microelectronic, or microelectromechanical device for processing and communicating data.

Client devices 110 may be communicatively coupled to one another and to other network resources via enterprise network 170. Enterprise network 170 may be any suitable network or combination of one or more networks operating on one or more suitable networking protocols, including for example, a local area network, an intranet, a virtual network, a wide area network, a wireless network, a cellular network, or the Internet (optionally accessed via a proxy, virtual machine, or other similar security mechanism) by way of nonlimiting example. Enterprise network 170 may also include one or more servers, firewalls, routers, switches, security appliances, antivirus servers, or other useful network devices. In this illustration, enterprise network 170 is shown as a single network for simplicity, but in some embodiments, enterprise network 170 may include a large number of networks, such as one or more enterprise intranets connected to the Internet. Enterprise network 170 may also provide access to an external network, such as the Internet, via external network 172. External network 172 may similarly be any suitable type of network.

A network administrator 150 may operate an administration console 140 to administer a workload cluster 142 and to otherwise configure and enforce enterprise computing and security policies.

Enterprise 100 may encounter a variety of "network objects" on the network. A network object may be any object that operates on or interacts with enterprise network 170. In one example, objects may be broadly divided into hardware objects, including any physical device that communicates with or operates via the network, and software objects. Software objects may be further subdivided as "executable objects" and "static objects." Executable objects include any object that can actively execute code or operate autonomously, such as applications, drivers, programs, executables, libraries, processes, runtimes, scripts, macros, binaries, interpreters, interpreted language files, configuration files with inline code, embedded code, and firmware instructions by way of non-limiting example. A static object may be broadly designated as any object that is not an executable object or that cannot execute, such as documents, pictures, music files, text files, configuration files without inline code, videos, and drawings by way of non-limiting example. In some cases, hybrid software objects may also be provided, for example, a word processing document with built-in macros or an animation with inline code. For security purposes, these may be considered as a separate class of software object, or may simply be treated as executable objects.

Enterprise security policies may include authentication policies, network usage policies, network resource quotas, antivirus policies, and restrictions on executable objects on client devices 110 by way of non-limiting example. Various network servers may provide substantive services such as routing, networking, enterprise data services, and enterprise applications.

Secure enterprise 100 may communicate across enterprise boundary 104 with external network 172. Enterprise boundary 104 may represent a physical, logical, or other boundary. External network 172 may include, for example, websites, servers, network protocols, and other network-based services. In one example, a wireless base station 130, an external server 180, and an application repository 182 may be provided on external network 172, by way of nonlimiting example. Wireless base station 130 may be, for example, an LTE base station or other similar device that connects to mobile device 110-3 wirelessly. Wireless base station 130 may in turn communicatively couple to external network 172. External server 180 may be a server that provides web pages, data, or other resources that enterprise users 120 may need to use.

Application repository 182 may represent a Windows or Apple "App Store" or update service, a Unix-like repository or ports collection, or other network service providing users 120 the ability to interactively or automatically download and install applications on client devices 110. In some cases, secured enterprise 100 may provide policy directives that restrict the types of applications that can be installed from application repository 182. Thus, application repository 182 may include software that is not malicious, but that is nevertheless against policy. For example, some enterprises restrict installation of entertainment software like media players and games. Thus, even a secure media player or game may be unsuitable for an enterprise computer. Security administrator 150 may be responsible for distributing a computing policy consistent with such restrictions and enforcing it on client devices 120.

In another example, secured enterprise 100 may simply be a family, with parents assuming the role of security administrator 150. The parents may wish to protect their children from undesirable content, such as pornography, adware, spyware, age-inappropriate content, advocacy for certain political, religious, or social movements, or forums for discussing illegal or dangerous activities, by way of nonlimiting example. In this case, the parent may perform some or all of the duties of security administrator 150.

Figure 1B:
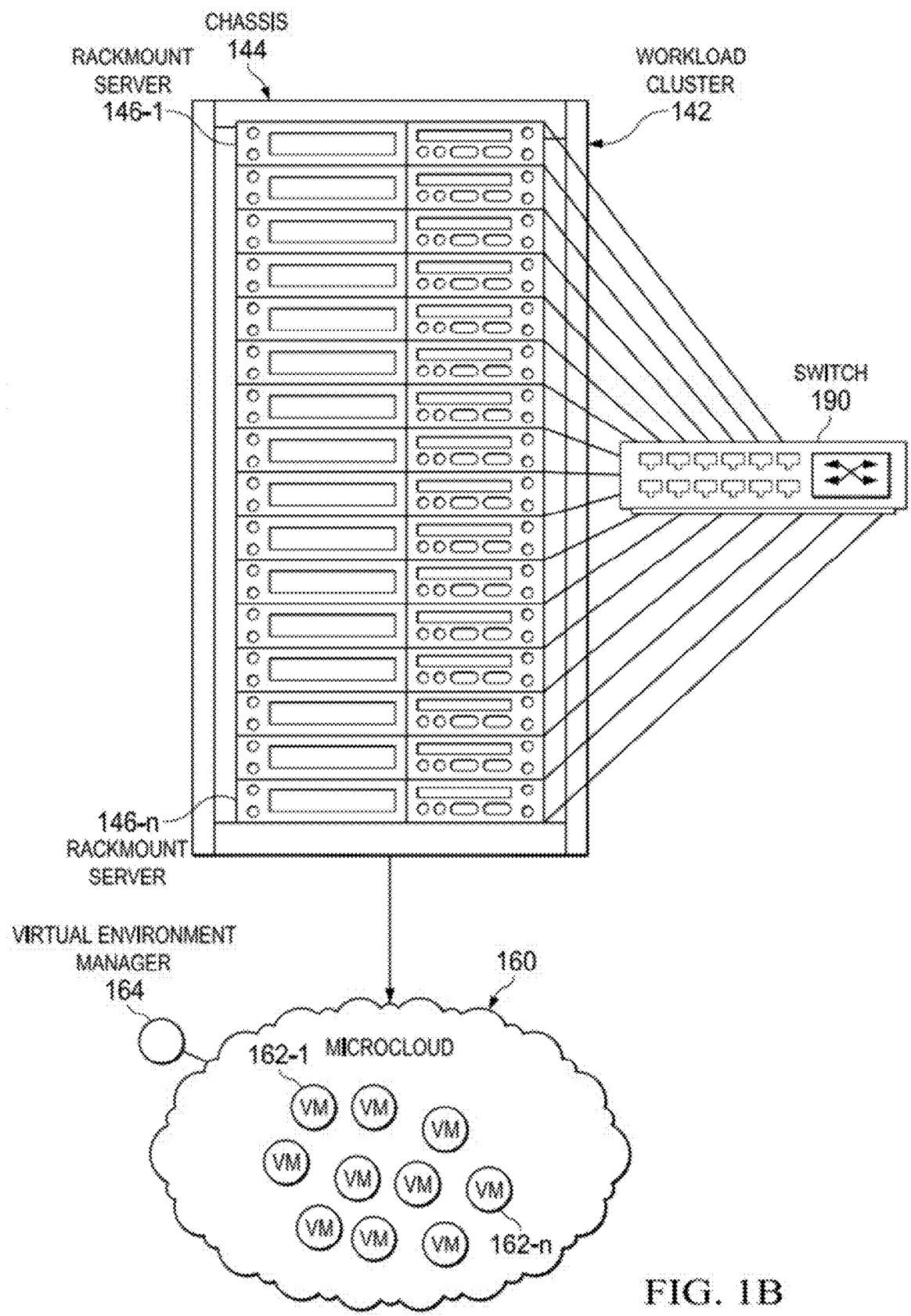
FIG. 1B is a more detailed view of a computing cluster according to one or more examples of the present Specification.

FIG. 1B is a block diagram disclosing a workload cluster 142 according to one or more examples of the present Specification. In this example, workload cluster 142 includes a rack mount chassis 144 which has installed therein a plurality of rack mount servers 146-1 through 146-N. Each rack mount server 146 may be a dedicated appliance, or may be configured with a hypervisor to launch one or more instances of a virtual client.

A switch 190 may be provided to communicatively couple workload cluster 142 to enterprise network 170. As described below, switch 190 may have a number of physical ports for communicatively coupling to rack mount servers 146. In an example, each server 146 has a physical wired connection, such as an Ethernet connection, to a single port of switch 190.

In some cases, some or all of rack mount servers 146-1 through 146-N are dedicated to providing a microcloud 160. Microcloud 160 may be a single purpose or dedicated cloud providing a particular service. For example, microcloud 160 may be configured to serve a website, provide communication systems such as one or more 4G LTE services, or any other appropriate service. In some cases, microcloud 160 is provided as a "tenant" on workload cluster 142. Workload cluster 142 may provide a virtual environment manager 164, which may be responsible for enforcing tenant boundaries between one or more microcloud tenants 160, and for dynamically provisioning virtual machines 162 as necessary. Virtual machines 162-1 through 162-N may represent a plurality of instances of a virtual server appliance. In some cases, VMs 162 may also be provided in different flavors. For example, some VMs 162 may be provisioned as firewalls, others may be provisioned as antivirus scanning appliance, and yet others may provide other auxiliary functions, in addition to VMs 162 provisioned as workload servers.

When switch 190 is provisioned with a load-balancing engine, the load-balancing engine is responsible for keeping track of the number and virtual IP (VIP) of workload servers, so that it can properly route traffic to the workload servers. In the case where each rack mount server 146 is a standalone appliance, switch 190 may maintain a table of the VIP of each rack mount server 146. In cases where workload servers are provided in a microcloud 160, switch 190 may provide a table that maps the VIP of each VM to a VIP assigned to the physical rack mount server 146 on which that VM 162 resides. Thus, switch 190 may include logic not only for routing the packet to the correct rack mount server 146, but also for directing the packet to the correct VM 162 on that rack mount server 146.

Figure 2A:
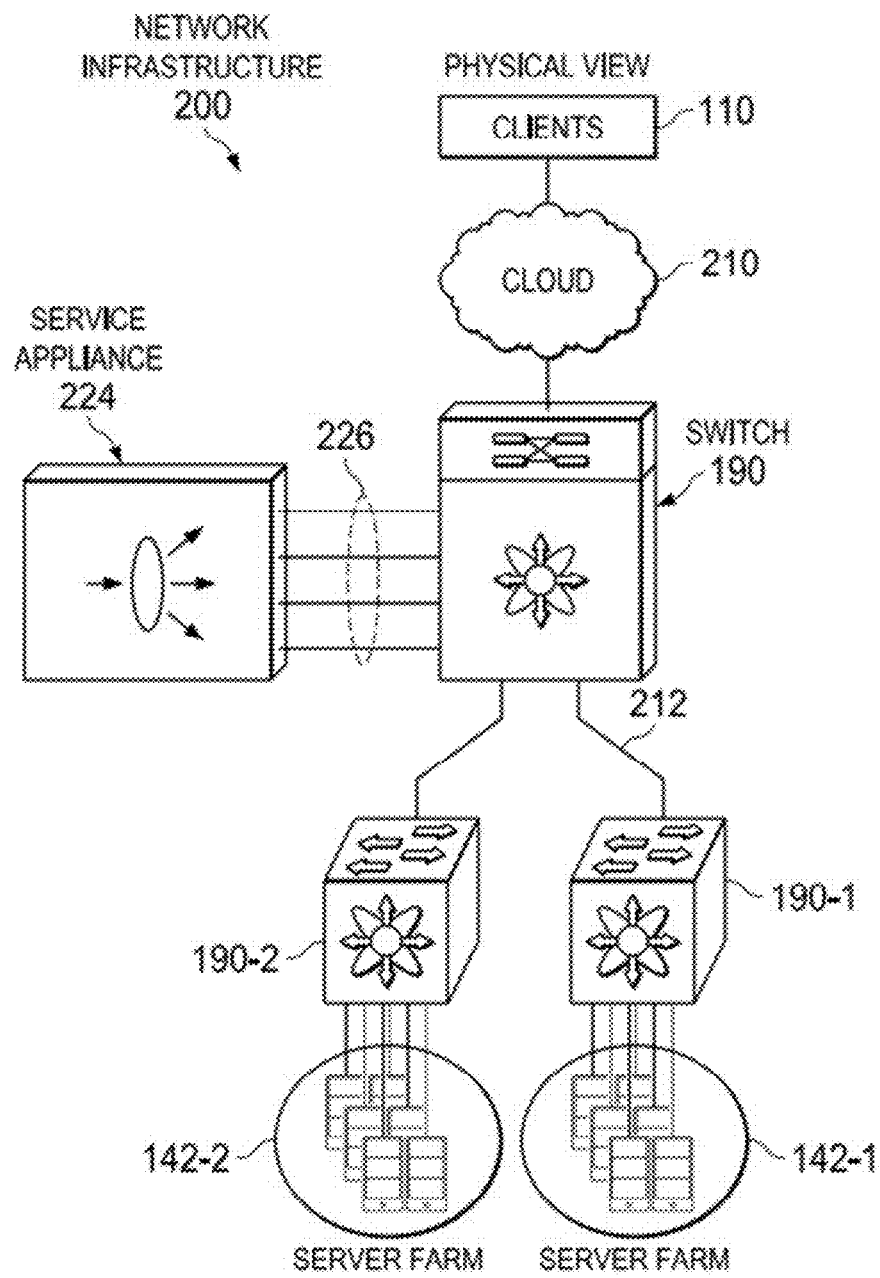
FIG. 2A is a is a simplified schematic diagram illustrating a physical view of a system for providing service appliances in a network environment according to one or more examples of the present Specification.
Figure 2B:
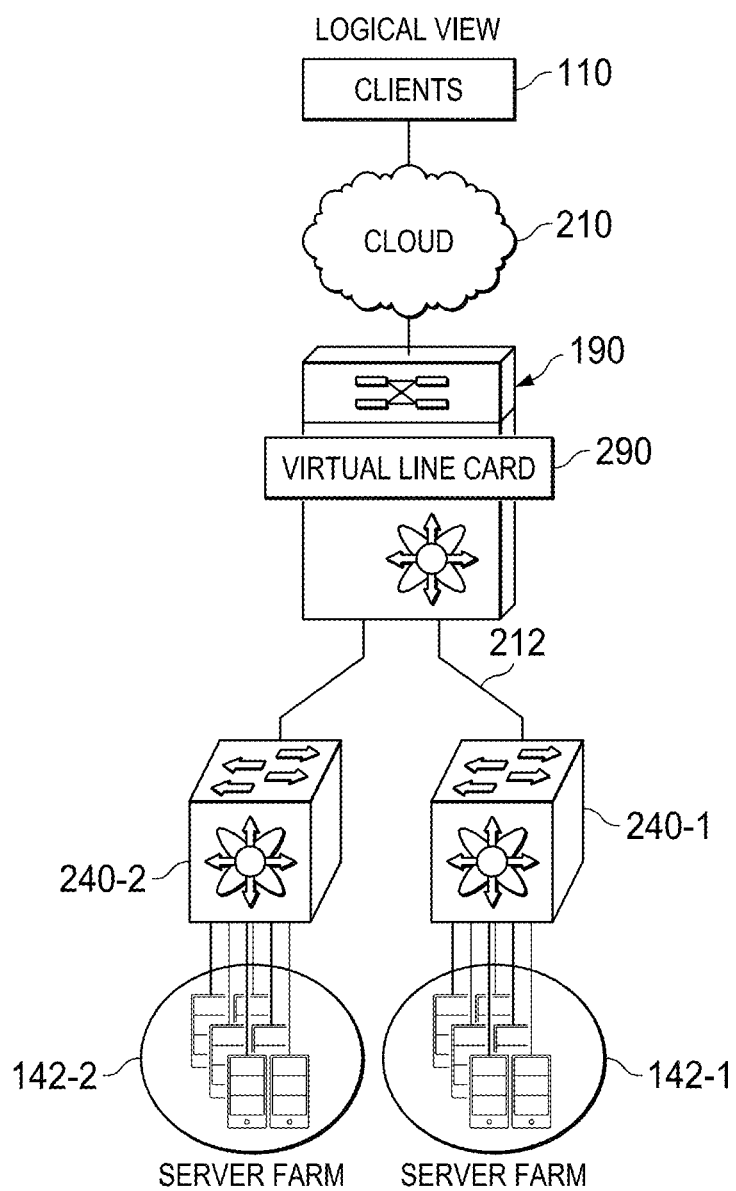
FIG. 2B is a simplified schematic diagram illustrating a logical view of the system according to one or more examples of the present Specification.

FIGS. 2A and 2B show examples of a system architecture for providing service appliances in a network environment, and specifically, providing service appliances as virtual line cards in a network switch. The virtual line card allows the service appliances to be located anywhere in the network, but other ways of providing the service appliance (e.g., directly connecting the service appliance on the switch) are also possible. It is noted that the examples are merely illustrative and are not intended to be limiting. Other architectures and configurations are envisioned by the disclosure.

FIG. 2A is a simplified schematic diagram illustrating a physical view of a system 110 for providing service appliances in a network environment. FIG. 2A includes a network (illustrated as multiple links 212) that connects one or more server farms 142-1 and 142-2 to one or more clients 110 via a cloud 210. Cloud 210 may encompass any public, semi-public, and/or private networks including enterprise networks, an Internet or intranet, community networks, etc. Individual servers in server farm 142-1 and 142-2 may communicate within the same farm via switches 240-1 and 240-2, respectively. Servers in server farm 142-1 may communicate with servers in server farm 142-2 via a switch 190 in this particular example implementation.

A service appliance 224 may connect to switch 190 over a communication channel 226 (e.g., over a port-channel). As used herein, a "communication channel" encompasses a physical transmission medium (e.g., a wire), or a logical connection (e.g., a radio channel, a network connection) used to convey information signals (e.g., data packets, control packets, etc.) from one or more senders (e.g., switch 190) to one or more receivers (e.g., service appliance 224). A communication channel, as used herein, can include one or more communication links, which may be physical (e.g., wire) or logical (e.g., data link, wireless link, etc.). Termination points of communication channels can include interfaces such as Ethernet ports, serial ports, etc. In embodiments of system 110, communication channel 326 may be a single channel: deployed for both control messages (i.e., messages that include control packets) and data messages (i.e., messages that include data packets).

As used herein, a "service appliance" is a discrete (and generally separate) hardware device or virtual machine with integrated software (e.g., firmware), designed to provide one or more network services including load balancing, firewall, intrusion prevention, virtual private network (VPN), proxy, etc. In some cases, switch 190 may be configured with an intelligent service card manager module (ISCM) 220, and service appliance 224 may be configured with a corresponding intelligent service card client module (ISCC) 230. ISCM 220 and ISCC 230 can form part of a Remote Integrated Service Engine (RISE) infrastructure for configuring service appliance 224 on the switch, e.g., as a virtual line card in switch 190.

FIG. 2B is a simplified schematic diagram illustrating a logical view of system 110. In some cases, ISCC 230 and ISCM 220 may be configured to allow service appliance 224 to appear as a virtual line card 290, or some other virtual network node/entity. The terms "line card" and "service module" are interchangeably used herein to refer to modular electronic circuits interfacing with telecommunication lines (such as copper wires or optical fibers) and that offer a pathway to the rest of a telecommunications network. Service appliance is often referred simply as "appliance" or "module" herein. Hence, virtual line card 290 is interchangeable (in certain instances) with ISCM 220. A virtual service module (or a virtual line card) is a logical instance (of a service module) providing the same functionalities (as the service module). Service modules may perform various functions including providing network services (e.g., similar to service appliances). One difference between a service module and a service appliance is that the service module is physically located within a switch, for example, on an appropriate slot. Virtual service modules are similarly configurable within a switch.

In an example, RISE (or comparable technologies) allows (external) service appliances connect to a switch and behave like a service module within a switch without having to take up a physical slot in the switch. RISE helps consolidate how the appliances are provisioned, and enables the appliances to have the benefits of being a service module within the switch. The task for provisioning and configuring of these service appliances is performed mostly by RISE being provided on the switch, making it easy for network administrators to add/remove service appliances in the network.

According to embodiments of the present disclosure, an appliance user can enjoy the same benefit of a service module's simple configuration and operation using the infrastructure of system 110. For example, setting up service appliance 224 for network configurations may be unnecessary. Substantially all such configurations may be made via switch 190, instead of service appliance 224. Service appliance 224 may offload (i.e., transfer) any network (e.g., L2/L3 network) specific control plane and data plane operations to switch 190. Data path acceleration that leverages an application specific integrated circuit (ASIC) (potentially embedded in switch 190) may also be possible in various embodiments. Switch 190 may communicate control messages to service appliance 224 over communication channel 326. Thus, configuration and provisioning of services within service appliance 224 may be implemented via switch 190.

Note that the numerical and letter designations assigned to the elements of FIGS. 2A and 2B do not connote any type of hierarchy; the designations are arbitrary and have been used for purposes of teaching only. Such designations should not be construed in any way to limit their capabilities, functionalities, or applications in the potential environments that may benefit from the features of system 110. For ease of description, only two representative server farms are illustrated in FIGS. 2A and 2B. Any number of server farms and switches may be connected in the network without departing from the broad scope of the present disclosure.

For purposes of illustrating the techniques of system 110, it is important to understand the communications in a given system such as the system shown in FIGS. 2A and 2B. The following foundational information may be viewed as a basis from which the present disclosure may be properly explained. Such information is offered earnestly for purposes of explanation only and, accordingly, should not be construed in any way to limit the broad scope of the present disclosure and its potential applications.

Typically, network services such as load balancing, firewall, intrusion prevention, proxy, virtual private network (VPN), etc. are provided through one or more of the following options: (1) service appliances that connect to network switches and routers; (2) specially designed high-performance routers configured with the services; or (3) network devices such as routers or switches that are configured with service modules that provide the services.

Some service appliances (e.g., load balancers) integrate services such as load balancing, firewall, intrusion prevention, VPN, etc. in a single box format, which is generally based on modular, scalable platforms and which provides a cost-effective option of the three options listed previously. Service appliances may be connected externally to a switch (e.g., aggregate switch or access switch, etc.) via appropriate ports. Different service appliances are designed with specific features applicable to different network environments. The service appliances may be deployed independently to service-specific areas of the network infrastructure, or they may be combined for a layered approach. Service appliances are typically located between the clients and server farms. Data packets generally pass through the service appliances on the way to (and from) the servers/clients. The service appliances may be managed by a management application (e.g., software) on the service appliance that enables configuration settings and other management functions.

Specially designed high-performance routers may also provide network services. Such routers may implement a massive parallel processor hardware and software architecture to deliver integrated network services (e.g., firewall, deep packet inspection, etc.). Many of the functionalities are embedded in a specially designed processor in the router. For example, such a specially designed router can provide an integrated security solution (e.g., stateful packet filtering, intrusion detection and prevention, per-user authentication and authorization, VPN capability, extensive QoS mechanisms, multiprotocol routing, voice application support, and integrated WAN interface support) and routing in a single box.

Network services may also be integrated into a network device (such as a switch or router) using dedicated line cards. The line cards may be installed inside the device, allowing any port on the device to operate as a firewall port, while integrating the services inside the network infrastructure. Several line cards may be installed in the same chassis, providing a modular solution where needed. Such solutions permit the user to take advantage of existing switching and routing infrastructure without any costly upgrades.

Turning to the potential infrastructure of FIGS. 2A and 2B, the example network environment may be configured as one or more networks and, further, may be configured in any form including, but not limited to, local area networks (LANs), wireless local area networks (WLANs), virtual local area networks (VLANs), metropolitan area networks (MANs), wide area networks (WANs), VPNs, Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

Elements of FIGS. 2A and 2B may be coupled to one another through one or more interfaces employing any suitable connection (wired or wireless), which provides a viable pathway for electronic communications. Additionally, any one or more of these elements may be combined or removed from the architecture based on particular configuration needs. System 110 may include a configuration capable of transmission control protocol/Internet protocol (TCP/IP) communications for the electronic transmission or reception of packets in a network. System 110 may also operate in conjunction with a user datagram protocol/IP (UDP/IP) or any other suitable protocol, where appropriate and based on particular needs. In addition, gateways, routers, switches, and any other suitable network elements may be used to facilitate electronic communication between various nodes in the network.

Switches in system 110, including switches 190, 240-1, and 240-2, may include any type of network element connecting network segments. For example, switches 190, 240-1, and 240-2 may include a multi-port network bridge that processes and routes data at a data link layer (Layer 2). In another example, switches 190, 240-1, and 240-2 may process data at a network layer (Layer 3), or Layer 4 (with network address translation and load distribution), or Layer 7 (load distribution based on application specific transactions), or at multiple layers (e.g., Layer 2 and Layer 3). In certain embodiments, functionalities of switches 190, 240-1, and 240-2 may be integrated into other network devices such as gateways, routers, or servers. In various embodiments, switches 190, 240-1, and 240-2 may be managed switches (e.g., managed using a command line interface (CLI), a web interface, etc.).

Communication channel 326 may include a port-channel, which can encompass an aggregation of multiple physical interfaces into one logical interface, for example, to provide higher aggregated bandwidth, load balancing and link redundancy. Communication channel 326 with multiple links can provide a high availability channel: if one link fails, traffic previously carried on this link can be switched to the remaining links. Communication channel 326 may contain up to 16 physical communication links and may span multiple modules for added high availability. In one embodiment, communication channel 326 can represent a port-channel with an aggregation of four point-to-point communication links over multiple ports. In another embodiment, communication channel 326 can represent a virtual port-channel (vPC).

Although FIGS. 2A and 2B show server farms 142-1 and 142-2, it should be appreciated that system 110 is not limited to servers. In fact, any network element may be connected to the network via appropriate switches, where these implementations may be based on particular needs. As used herein, the term "network element" is meant to encompass computers, virtual machines, network appliances, servers, routers, switches, gateways, bridges, load balancers, firewalls, processors, modules, or any other suitable device, component, proprietary element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information. For example, server farms 142-1 and 142-2 may be replaced with LANs connecting desktop computers in a small office.

In another example, server farms 142-1 and 142-2 may be replaced with a network of wireless communication devices. In yet another example, server farms 142-1 and 142-2 may be replaced with one or more supercomputers. Various other configurations and devices are contemplated within the broad framework of the present disclosure.

According to embodiments of the present disclosure, system 110 may provide for a fabric extender (FEX)-like protocol, auto-discovery, message transport service (MTS)-like control messages, and defined messages between service appliance 224 and switch 190. Configuration of service appliance 224 may be performed on switch 190 as for a line card. Data path forwarding may be offloaded to network line cards in switch 190. Control path processing may be offloaded to a supervisor engine on switch 190 as appropriate. In embodiments where service appliance 224 has multiple virtual services (e.g., virtual machines), each virtual service may be a separate virtual line card on switch 190.

Figure 3:
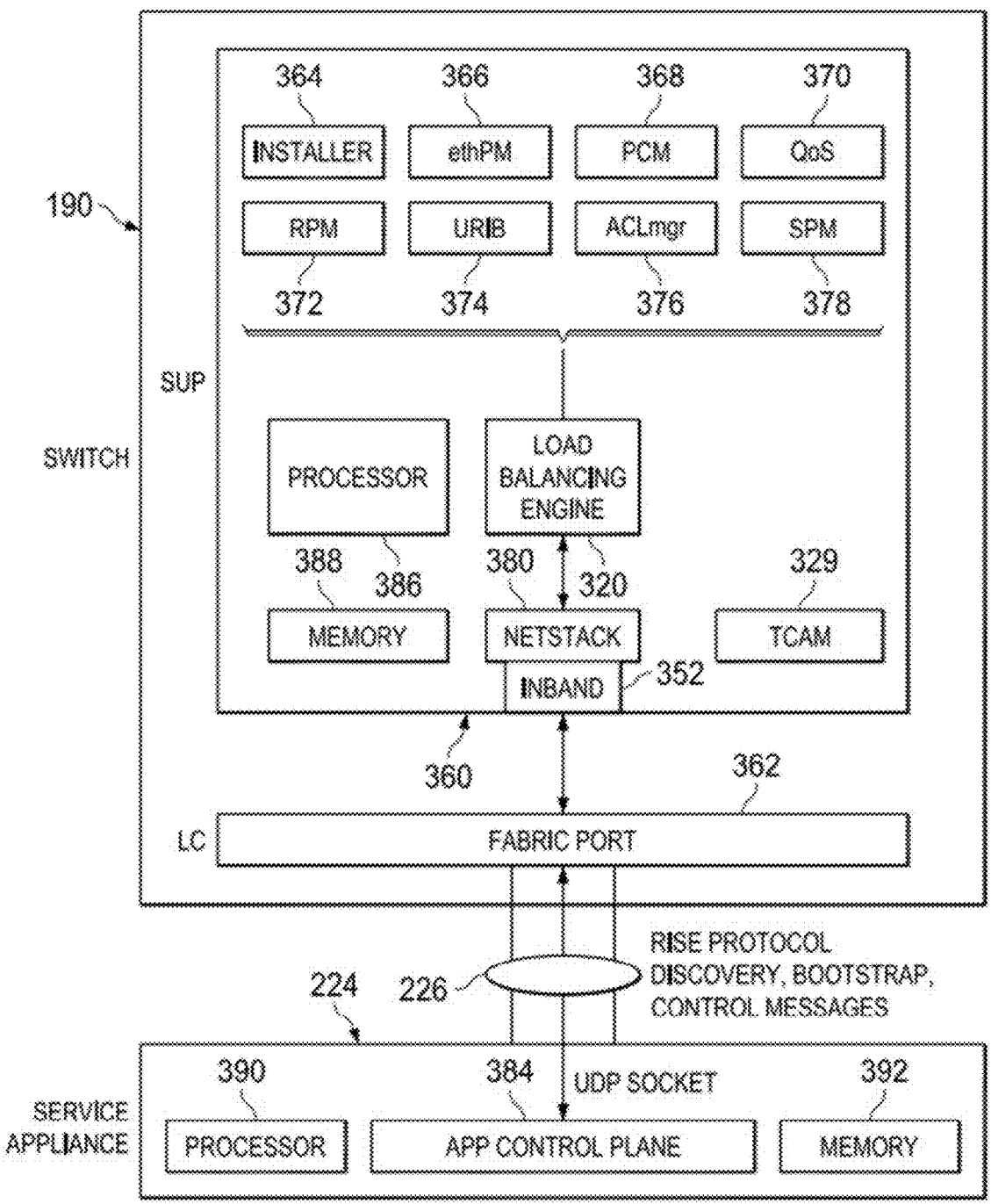
FIG. 3 is a block diagram of a network switch according to one or more examples of the present Specification.

FIG. 3 is a simplified block diagram illustrating example details of system 110 according to embodiments of the present disclosure. A supervisor engine 360 on switch 190 may communicate with service appliance 224 via a line card including a fabric port 362 that connects point-to-point to a node on service appliance 224. Supervisor engine 360 may include several modules such as an installer 364, an Ethernet port manager (ethPM) 366, a port-channel manager (PCM) 368, a Quality of Service (QoS) element 370, a route policy manager (RPM) 372, a unified/unicast routing information base (URIB) 374, an access control list manager (ACLmgr) 376, and a service policy manager (SPM) 378 for performing various routing and/or management functions. ISCM 220 may be provisioned in supervisor engine 360 to provide RISE related functionalities. ISCM 220 may manage one or more service modules, including in-chassis service modules and remote service modules.

In various embodiments, service appliance 224 may support stream control transmission protocol (SCTP) with various addresses (e.g., 127 addresses). In the absence of native SCTP support in supervisor engine 360, tunneling over UDP may be enforced to send SCTP packets. A Netstack module 380 may be provisioned in supervisor engine 360 for implementing TCP/IP stack for received frames hitting the control-plane of supervisor engine 360. Supervisor engine 360 may be configured with an inband port 352, which may be a virtual port that provides an interface for management traffic (such as auto-discovery) to a management processor such as a processor 386.

Each logical block disclosed herein is broadly intended to include one or more logic elements configured and operable for providing the disclosed logical operation of that block. As used throughout this Specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In various examples, a "processor" may include any combination of logic elements, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case processor 386 may be treated as only one core of a multi-core processor, or may be treated as the entire multi-core processor, as appropriate. In some embodiments, one or more co-processor may also be provided for specialized or support functions. In some examples, the processor is a programmable hardware device, which in this Specification expressly excludes a general-purpose CPU.

Load balancing engine 320, in one example, is operable to carry out computer-implemented methods as described in this Specification. Load balancing engine 320 may include one or more processors, and one or more non-transitory computer-readable mediums having stored thereon executable instructions operable to instruct a processor to provide load balancing. As used throughout this Specification, an "engine" includes any combination of one or more logic elements, of similar or dissimilar species, operable for and configured to perform one or more methods provided by load balancing engine 320. Thus, load balancing engine 320 may comprise one or more logic elements configured to provide methods as disclosed in this Specification. In some cases, load balancing engine 320 may include a special integrated circuit designed to carry out a method or a part thereof, and may also include software instructions operable to instruct a processor to perform the method. In some cases, load balancing engine 320 may run as a "daemon" process. A "daemon" may include any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space," or in ring 0, 1, or 2 in a protection ring architecture. It should also be noted that load balancing engine 320 may also include other hardware and software, including configuration files, registry entries, and interactive or user-mode software by way of non-limiting example.

In one example, load balancing engine 320 includes executable instructions stored on a non-transitory medium operable to perform a method according to this Specification. At an appropriate time, such as upon booting computing device 200 or upon a command from operating system 222 or a user 120, processor 210 may retrieve a copy of load balancing engine 320 (or software portions thereof) from storage 250 and load it into memory 220. Processor 210 may then iteratively execute the instructions of load balancing engine 320 to provide the desired method.

In another example, load balancing engine 320 includes logic executed on an ASIC, FPGA, or other low-level hardware device specifically programmed to carry out the functions of load balancing engine 320. In one case, any portions of load balancing engine 320 that are not hard-coded into the logic may be loaded from a firmware or similar memory. In this case, load-balancing engine 320 may operate without the benefit of an operating system, to improve speed and efficiency.

Load balancing engine 320 may also communicatively couple to a TCAM 329. TCAM 329 may be configured to provide high-speed searching as disclosed herein.

According to various embodiments, ISCM 220 may offer various functionalities such as handling (i.e., accommodating, managing, processing, etc.) RISE messages (e.g., in MTS format), high availability activities, timer events, packet switch stream (PSS), American Standard Code for Information Interchange (ASCII) generation, logging, event handling, health monitoring, debugging, etc. ISCM 220 may be a finite state machine utility (FSMU) based application (e.g., which indicates an abstract machine that can be in one of a finite number of states). In various embodiments, ISCM 220 may have a well-defined MTS seamless authentication protocol (MTS SAP) assigned and it can open a socket-based MTS queue and bind to the well-defined SAP such that other processes may communicate with it.

In various embodiments, ISCM 220 may also maintain an array of MTS operation code ("opcode"), which can define how to process a received MTS message. The array may include per-opcode specific MTS flags, handler functions, etc. ISCM 220 may be configured to receive CLI driven MTS messages, MTS notifications (such as event driven messages indicating, for example, that a particular VLAN is up or down), and MTS request/responses. In various embodiments, ISCM 220 may be configured so that MTS-based communication with other processes may be non-blocking and asynchronous. Thus, ISCM 220 may handle multiple events (which can arrive at any time) for the same resource such that the state of the resource is consistent (and not compromised). A similar opcode can be provided even in non-MTS messages, which serves to indicate how to a switch or a service can process the message.

After ports (e.g., appliance ports and switch ports) have been configured in RISE mode, ISCM 220 and ISCC 230 may perform auto-discovery and bootstrap to establish an appropriate control channel. After the control channel is established, applications in service appliance 224 may send control messages (e.g., using the UDP socket interface) to ISCC 230 through an application control plane 384. Application control plane 384 generally encompasses one or more software components for performing workflow management, self-management, and other application control layer processes. ISCC 230 may forward the control messages to ISCM 220 of switch 190 over communication channel 326. In example embodiments, ISCM 220 and ISCC 230 may communicate via UDP packets; however, various other protocols and formats may be accommodated by the teachings of the present disclosure. Supervisor 360 may be provisioned with (or have access to) processor 386 and a memory 388 for performing its various functions. ISCM 220 may use processor 386 and memory 388 to perform RISE related functions in switch 190. Similarly, service appliance 224 may be provisioned with (or have access to) a processor 390 and a memory 392. ISCC 230 may use processor 390 and memory 392 to perform RISE related functions in service appliance 224.

Figure 4:
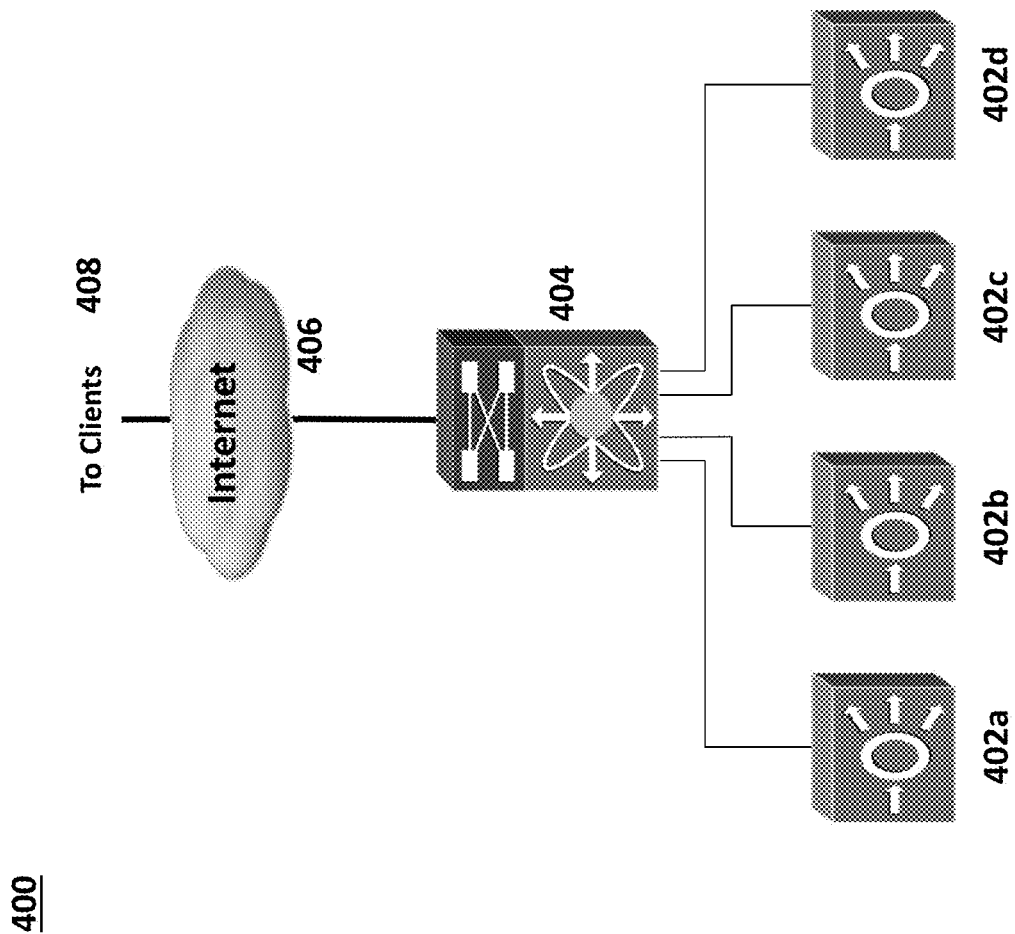
FIG. 4 is a schematic diagram of a network that includes a network switch connected to a plurality of service appliances in accordance with embodiments of the present disclosure.

FIG. 4 is a schematic diagram of a network 400 that includes a network switch connected to a plurality of service appliances in accordance with embodiments of the present disclosure. The network 400 can include similar features as those described with FIGS. 1-2. For example, network 400 includes a network switch 404. Switch 404 can be similar to switch 190. The network 400 can also include a plurality of service appliances 402a-402d. In embodiments, service appliances 402a-402d can provide firewall functionality, and can also share load balancing and routing functionality with the network switch 404. In some embodiments, service appliances 402a-402d can be line cards organized in a chassis, as described in FIG. 5.

The switch 404 can direct traffic to the service appliances 402a-402d based on, for example, a load balancing algorithm as described above. In embodiments, the switch 404 can share results of the load balancing algorithm with each of the service appliances 402a-402d. Each service appliance 402a-402d can receive a unique load balancing result (e.g., a hash) from the switch that uniquely identifies the service appliance as an owner of a flow. A flow can be a source-destination pair. The service appliances 402a-402d, therefore, can each act as a firewall as well as share the load balancing function with the switch 404.

In embodiments, each service appliance 402a-402d can be configured as a cluster, using a clustering protocol that allows each service appliance 402a-402d to communicate with each other. In some embodiments, the service appliances 402a-402d are synchronized through the clustering protocol In embodiments, each service appliance 402a-402d can receive the hashing table from the switch 404. In scenarios where the service appliances 402a-402d are clustered, a service appliance can redirect traffic to another service appliance. For example, service appliance 402b can receive from the switch 404 a hashing table identifying flows owned by each service appliance 402a-402d. If traffic arrives at service appliance 402b destined or intended for service appliance 402c, service appliance 402b can identify the owner of the flow based, at least in part, on the hashing table and the source-destination pair of the traffic—in this example, service appliance 402b identifies service appliance 402c as the flow owner and can route traffic to service appliance 402c. By doing so, the service appliance 402b can share some of the firewall flow routing bandwidth with the switch 404, thereby freeing bandwidth for the switch 404.

In some embodiments, the service appliances 402a-402d can be configured with firewall policies for traffic flows owned by the respective service appliance, which each service appliance can implement once it has been attached to a switch. The service appliance need not be configured by an orchestrator or other fabric/network controller with policy information.

In some embodiments, the switch 404 can manage routing for the service appliances that act as firewalls. The service appliances 402a-402d can participate in routing data traffic. For example, a service appliance 402a acting as a firewall may need to route incoming traffic to a destination (or vice versa). The service appliance 402a can receive from the switch 404 a portion of a routing table, BGP table, OSPF protocol, or other routing protocol, that includes active routes for traffic flows owned by the service appliance 402a.

Figure 5:
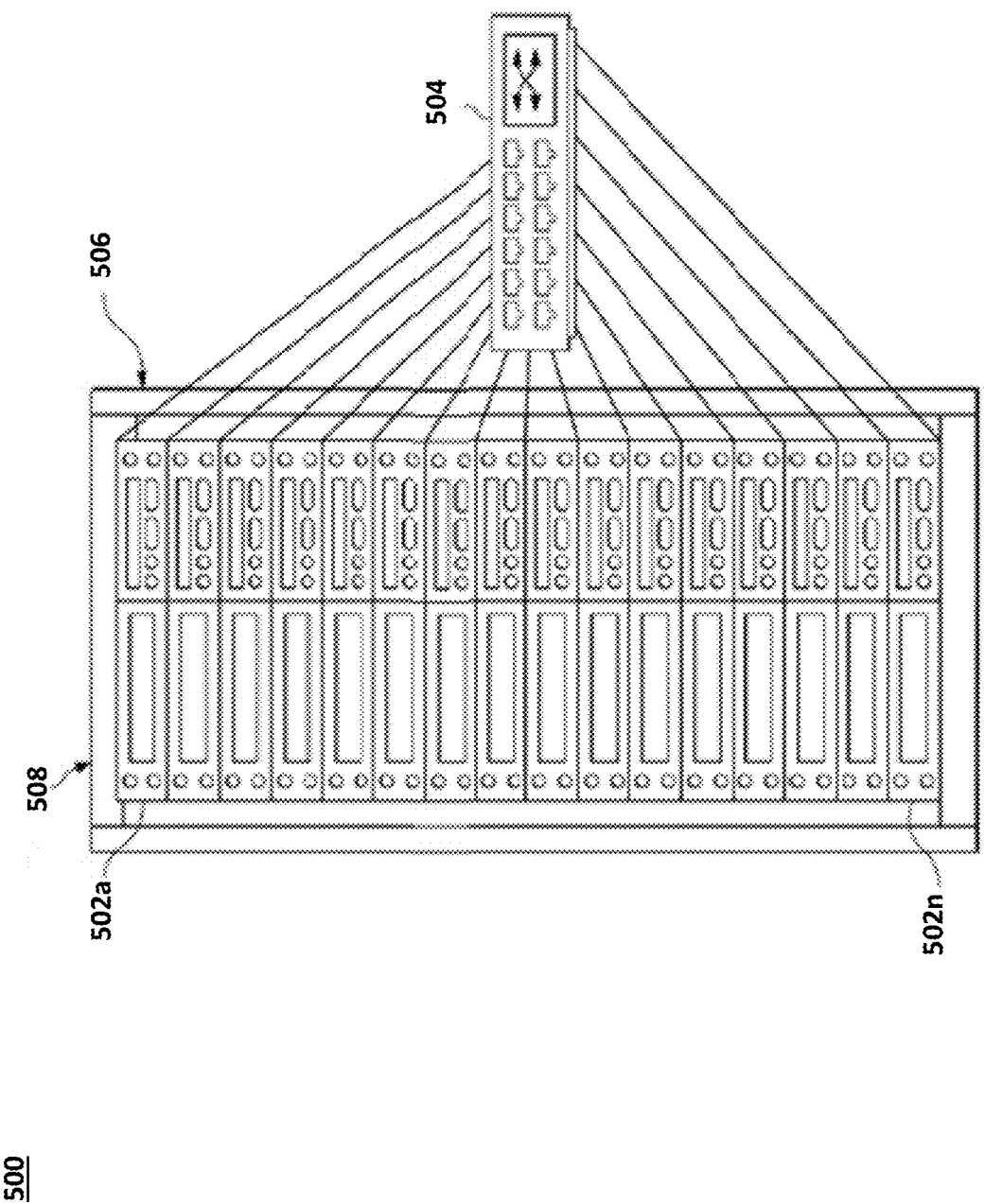
FIG. 5 is a schematic diagram of an example cluster of service appliances in accordance with embodiments of the present disclosure.

The switch 404 can identify active routes for a service appliance from a routing table and create a sub-table for the service appliance 402a. The switch can then share the sub-table with the service appliance 402a. The service appliance 402a can identify active routes for traffic flows owned by the service appliance 402a and route traffic based on source-destination information. The service appliance 402a FIG. 5 is a schematic diagram of an example clustering of service appliances in accordance with embodiments of the present disclosure. A chassis 506 can include a plurality of service appliances 502a-502n. The service appliances 502a-502n can be line cards received by the chassis 506. A switch 504 can be communicably coupled to each service appliance 502a-502n through the chassis 506. Each service appliance 502a-502n can be clustered together through a clustering protocol. The clustering protocol can facilitate communications between each service appliance 502a-502n, and can allow the service appliances 502a-502d to be synchronized with respect to load balancing hash tables and routing protocols.

FIG. 6 is a process flow diagram 600 for load balancing in a service appliance in accordance with embodiments of the present disclosure. In embodiments, a first service appliance can provide firewall functionality for the network onto which the first service appliance is connected. The first service appliance can receive, from a network switch, at least a portion of a hashing table (602). The hashing table can be created by the network switch for each service appliance to share load balancing functionalities with the network switch. The hashing table uniquely identifies each service appliance based on, e.g., a source and destination IP address. In embodiments, the network switch can provide the entire hashing table to the first service appliance.

The first service appliance can receive a data packet (604). The first service appliance can receive the data packet from an outside network or from the network switch (for service appliances acting as a firewall for the network fabric). The first service appliance can determine a flow owner for the data packet based, at least in part, on the hashing table (606). The first service appliance can be clustered with other service appliances, and synchronized with these other service appliances, e.g., using a clustering protocol that allows the service appliances to communicate with each other. The first service appliance can determine that the data traffic the first service appliance received belongs to another, second service appliance, based at least in part on the hashing table (608). Transmitting the data packet to the second service appliance (610). For example, the first service appliance can use the clustering protocol to transmit the data packet to the second service appliance. The first service appliance, therefor, shares load balancing functionality with the network switch by forwarding data packets to another, second service appliance using e.g., the hashing table and the clustering protocol. In some embodiments, the hashing table can be augmented with a forwarding table, such as a routing table, FIB, adjacency list, OSPF, etc.

FIG. 7 is a process flow diagram for is a process flow diagram 700 for routing data packets in a service appliance in accordance with embodiments of the present disclosure. In embodiments, a first service appliance can provide firewall functionality for the network onto which the first service appliance is connected. The first service appliance can The first service appliance can receive, from a network switch, at least a portion of a routing table (702). The routing table can be created by the network switch for each service appliance to share load balancing functionalities with the network switch. The routing table uniquely identifies each service appliance based on, e.g., a source and destination IP address. In embodiments, the network switch can provide the entire routing table to the first service appliance.

The first service appliance can receive a data packet (704). The first service appliance can receive the data packet from an outside network or from the network switch (for service appliances acting as a firewall for the network fabric). The first service appliance can determine a flow owner for the data packet based, at least in part, on the routing table (706). The first service appliance can be clustered with other service appliances, and synchronized with these other service appliances, e.g., using a clustering protocol that allows the service appliances to communicate with each other. The first service appliance can determine that the data traffic the first service appliance received belongs to another, second service appliance, based at least in part on the routing table (708). Transmitting the data packet to the second service appliance (1010). For example, the first service appliance can use the clustering protocol to transmit the data packet to the second service appliance. The first service appliance, therefor, can perform routing functionality with the network switch by forwarding data packets to another, second service appliance using e.g., the routing table and the clustering protocol.

In some embodiments, the first service appliance can receive, from the network switch, an update to the routing table (712). The first service appliance can update a routing table with the updated received from the network switch (714). The network switch, thus, can manage routing tables on behalf of the service appliance.

Figure 8:
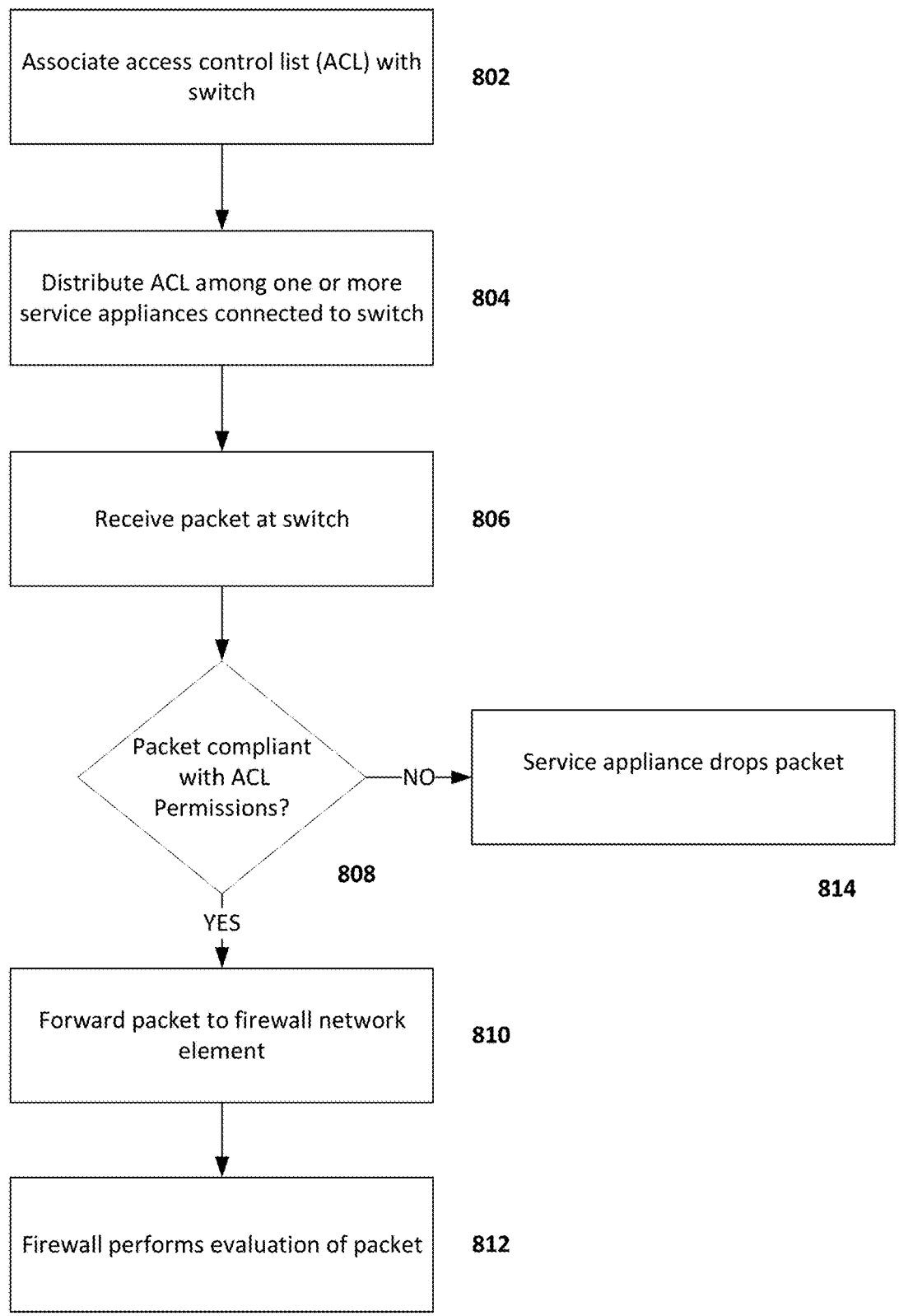
FIG. 8 is a process flow diagram for dynamically controlling access control lists in accordance with embodiments of the present disclosure.

FIG. 8 is a process flow diagram 800 for dynamically controlling access control lists in accordance with embodiments of the present disclosure. An access control list (ACL) can reside on a firewall of a fabric network. The firewall can use an ACL to enforce traffic policies (e.g., to drop or pass certain types of traffic). In embodiments, the firewall can offload some of the ACL policy enforcement to a switch that directs traffic towards the firewall (802). In embodiments, the switch can rely on a connected service appliance compliant with the RISE protocol to communicate with the switch (e.g., as shown in FIG. 4) (804). A packet can be received at the switch (806). The switch can perform a first pass traffic filtering based on the ACL policies (808). In embodiments, the switch can rely on a connected service appliance (or more than one connected service appliance) to perform ACL permissions filtering for received packets. If the switch determines that the packet does not satisfy ACL permissions, then the switch can drop packets that do not meet one or more policies or permissions listed in the ACL (814). If the packet is in compliance with the ACL permissions, the switch can pass the packet to the firewall (810). The firewall can then perform a deeper, more thorough inspects of packets (812).

In embodiments, the access control lists can be offloaded to a service appliance, such as during distributed denial of service (DDoS) attacks or dynamically for other security reasons. For example, a DDoS attack can overburden the firewall. By pushing the ACL to a service appliance supported switch, the firewall burden can be reduced by distributing at least some ACL enforcement responsibilities to the switch. In embodiments, the RISE protocol can install a policy-based routing (PBR) rule to redirect traffic based on dynamic ACL permissions.

Figure 9:
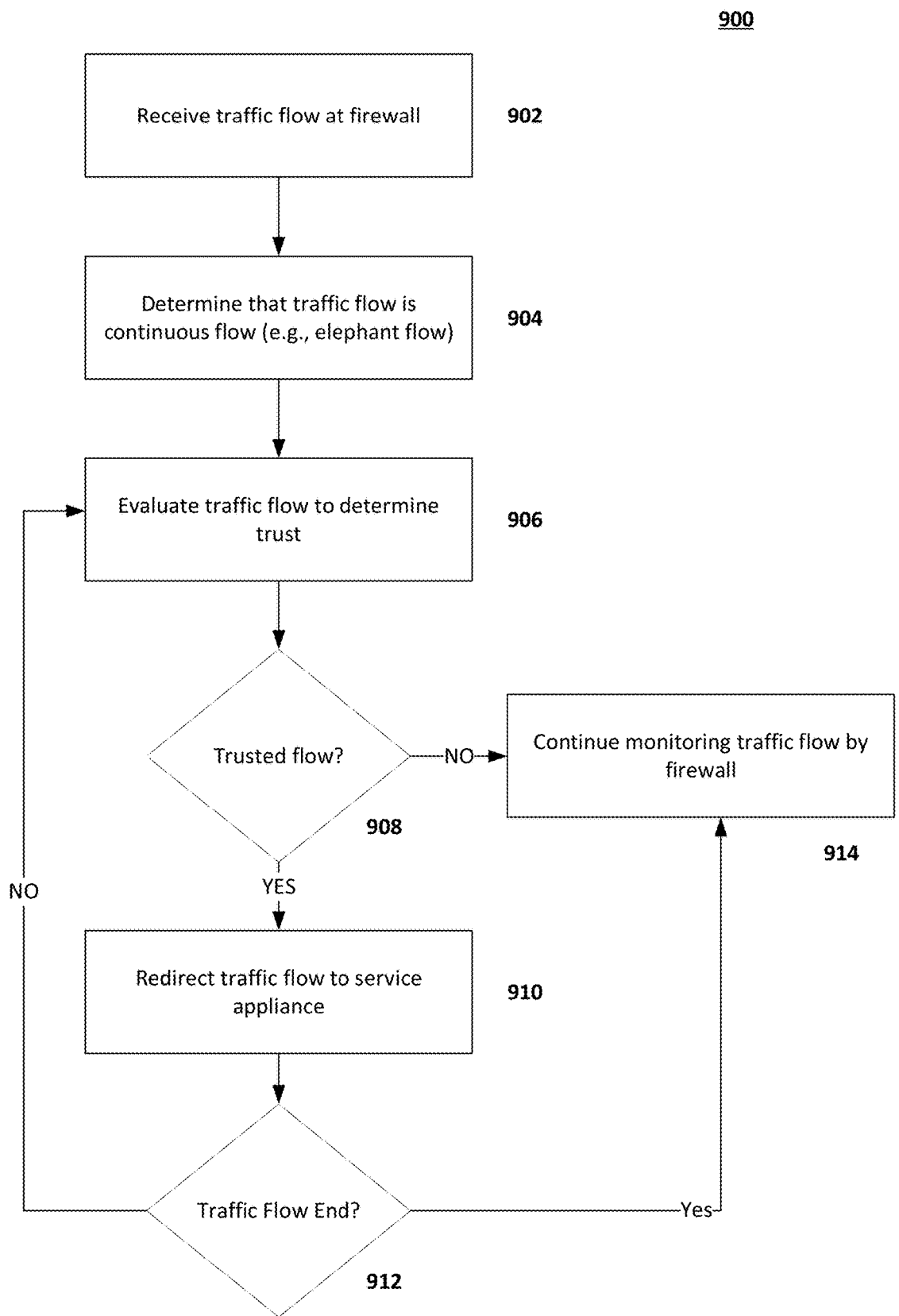
FIG. 9 is a process flow diagram for offloading trusted flows to a service appliance in accordance with embodiments of the present disclosure.

FIG. 9 is a process flow diagram 900 for offloading trusted flows to a service appliance in accordance with embodiments of the present disclosure. In embodiments, a firewall can offload trusted flows to a service appliance. The firewall can receive a flow of traffic (902). The firewall can determine that the traffic flow is continuous and that demands high throughput (904). For example, the firewall can determine that the traffic is considered an elephant flow or other low-latency, long-lived continuous traffic flow. The firewall can evaluate the packets in the traffic flow based on trust policies to determine whether the traffic flow is a trusted flow (906).

If the traffic flow is not trusted (908), then the firewall can continue monitoring the traffic flow (916). If the traffic flow is trusted (908), then the firewall can redirect the traffic flow to a service appliance or the data traffic can be instructed to bypass the firewall (910). The firewall can periodically check on the traffic flow to ensure that the data packets are trusted. To do so, as the traffic flow continues, the firewall can have packets directed to the firewall to evaluate the traffic flow (912→906). If the traffic flow is over, then the firewall can monitor the traffic flow as normal (914).

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, provisioned in service appliance 224 and/or switch 190 (e.g., through various modules, algorithms, processes, etc.). In some embodiments, one or more of these features may be implemented in hardware, provided external to these elements, or consolidated in any appropriate manner to achieve the intended functionality. Service appliance 224 and/or switch 190 may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, switch 190 and service appliance 224 described and shown herein (and/or their associated structures) may also include suitable interfaces for receiving, transmitting, and/or otherwise communicating data or information in a network environment. Additionally, some of the processors and memories associated with the various network elements may be removed, or otherwise consolidated such that a single processor and a single memory location are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memories (e.g., memory 392, memory 388) can store data used for the operations described herein. This includes the memory being able to store instructions (e.g., as part of logic, software, code, etc.) that are executed to carry out the activities described in this Specification. A processor can execute any type of instructions associated with the data to achieve the operations detailed herein in this Specification. In one example, processors 386 and processor 390 could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, components in system 110 can include one or more memory elements (e.g., memory 388, memory 392) for storing information to be used in achieving operations as outlined herein. These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in system 110 could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, formatting, and protocols, system 110 may be applicable to other exchanges, formats, or routing protocols. Moreover, although system 110 has been illustrated with reference to particular elements and operations that facilitate the communication process, these elements, and operations may be replaced by any suitable architecture or process that achieves the intended functionality of system 110.

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "steps for" are specifically used in the particular claims; and (b) does not intend, by any statement in the Specification, to limit this disclosure in any way that is not otherwise reflected in the appended claims.

What is claimed is:

1. A method of data plane integration performed at a first service appliance, the first service appliance providing firewall functionality, the method comprising:
   receiving, from a network switch, a hashing table, wherein the hashing table uniquely associates one or more service appliances with a traffic flow based at least in part on a source-destination Internet protocol address;
   receiving a data packet from a network location;
   determining a flow owner of the data packet based on the hashing table; and
   transmitting the data packet based on the determined flow owner of the data packet.

2. The method of claim 1, wherein the first service appliance is clustered with one or more second service appliances, and wherein:
   determining the flow owner comprises identifying that one of the one or more second service appliances is the flow owner of the data packet based, at least in part, on the hashing table.

3. The method of claim 2, wherein transmitting the data packet to the flow owner comprises:
   transmitting the data packet to the identified second service appliance through a clustering protocol.

4. The method of claim 1, further comprising:
   receiving routing information from the network switch; and
   forwarding the data packet to the flow owner based on the routing information.

5. The method of claim 4, wherein the routing information is part of a routing table or forwarding information base table.

6. The method of claim 4, further comprising:
   receiving, from the network switch, an update to the routing information; and
   updating the routing information using the update received from the network switch.

7. The method of claim 1, further comprising:
   determining one or more policies for the received data packet; and
   forwarding the data packet based, at least in part, on the one or more policies.

8. The method of claim 7, wherein the one or more policies comprise a firewall policy.

9. A computer-readable non-transitory medium comprising one or more instructions for load balancing in a network service appliance, the instructions when executed on a processor are operable to:
   receive, from a network switch, a hashing table, wherein the hashing table uniquely associates one or more network service appliances with a traffic flow based, at least in part, on a source-destination Internet protocol address;
   receive a data packet from a network location;
   determine a flow owner of the data packet based on the hashing table; and
   transmit the data packet based on the determined flow owner of the data packet.

10. The computer-readable non-transitory medium of claim 9, wherein the network service appliance is a first network service appliance, the first network service appliance is clustered with one or more second network service appliances, and wherein:
    determining the flow owner comprises identifying that one of the one or more second network service appliances is the flow owner of the data packet based, at least in part, on the hashing table.

11. The computer-readable non-transitory medium of claim 10, wherein transmitting the data packet to the flow owner comprises:
    transmitting the data packet to the identified second network service appliance through a clustering protocol.

12. The computer-readable non-transitory medium of claim 9, the instructions further operable when executed to:
    receive routing information from the network switch; and
    forward the data packet to the flow owner based on the routing information.

13. The computer-readable non-transitory medium of claim 12, wherein the routing information is part of a routing table or forwarding information base table.

14. The computer-readable non-transitory medium of claim 12, the instructions further operable when executed to:
   receive, from the network switch, an update to the routing information; and
   update the routing information using the update received from the network switch.

15. The computer-readable non-transitory medium of claim 12, further comprising:
   determining one or more policies for the received data packet; and
   forwarding the data packet based, at least in part, on the one or more policies.

16. A network service appliance communicably coupled to a network switch, the network service appliance configured to provide firewall functionality, the network service appliance comprising:
   at least one memory element having instructions stored thereon;
   at least one processors coupled to the at least one memory element and configured to execute the instructions to cause the network service appliance to:
      receive, from a network switch, a hashing table, wherein the hashing table uniquely associates one or more network service appliances with a traffic flow based, at least in part, on a source-destination Internet protocol address;
      receive a data packet from a network location;
      determine a flow owner of the data packet based on the hashing table; and
      transmit the data packet based on the determined flow owner of the data packet.

17. The first network service appliance of claim 16, wherein the network service appliance is a first network service appliance, the first network service appliance is clustered with one or more second network service appliances, and wherein the instructions are further operable when executed to:
   determine the flow owner comprising identifying one of the one or more second network service appliances is the flow owner of the data packet based, at least in part, on the hashing table; and
   transmit the data packet to the identified second network service appliance through a clustering protocol.

18. The network service appliance of claim 16, wherein the instructions are further operable when executed to:
   receive routing information from the network switch; and
   forward the data packet to the flow owner based on the routing information.

19. The network service appliance of claim 18, wherein the routing information is part of a routing table or forwarding information base table.

20. The network service appliance of claim 16, wherein the instructions are further operable when executed to:
   determine one or more policies for the received data packet; and
   forward the data packet based, at least in part, on the one or more policies.

* * * * *

UNITED STATES PATENT AND TRADEMARK OFFICE
CERTIFICATE OF CORRECTION

PATENT NO. : 10,491,522 B2
APPLICATION NO. : 15/482566
DATED : November 26, 2019
INVENTOR(S) : Samar Sharma Page 1 of 1

It is certified that error appears in the above-identified patent and that said Letters Patent is hereby corrected as shown below:

In the Claims

Claim 17, Column 24, Line 6, please replace "The first network" with --The network--

Signed and Sealed this
Thirty-first Day of December, 2019

Andrei Iancu
*Director of the United States Patent and Trademark Office*